United States Patent [19]

Gu et al.

[11] Patent Number: 5,510,974
[45] Date of Patent: Apr. 23, 1996

[54] HIGH FREQUENCY PUSH-PULL CONVERTER WITH INPUT POWER FACTOR CORRECTION

[75] Inventors: Wen-Jian Gu; Rui Liu, both of Croton-on-Hudson, N.Y.

[73] Assignee: Philips Electronics North America Corporation, New York, N.Y.

[21] Appl. No.: 174,532

[22] Filed: Dec. 28, 1993

[51] Int. Cl.$^6$ ................................................. H02M 7/538
[52] U.S. Cl. .................................................. 363/134; 363/24
[58] Field of Search .............................. 363/24, 25, 26, 363/97, 101, 133, 134

[56] References Cited

U.S. PATENT DOCUMENTS

| | | | |
|---|---|---|---|
| 4,104,715 | 8/1978 | Lawson, Jr. | 363/97 X |
| 4,150,424 | 4/1979 | Nuechterlein | 363/26 |
| 4,257,089 | 3/1981 | Ravis | 363/25 |
| 4,322,817 | 3/1982 | Kuster | 363/26 |
| 4,415,962 | 11/1983 | Kassaktian | 363/134 X |
| 4,729,088 | 3/1988 | Wong | 363/26 X |
| 4,985,664 | 1/1991 | Nilssen | 315/209 R |
| 5,001,400 | 3/1991 | Nilssen | 315/209 R |
| 5,113,334 | 5/1992 | Tuson et al. | 363/25 |

*Primary Examiner*—Peter S. Wong
*Assistant Examiner*—Y. J. Han
*Attorney, Agent, or Firm*—Bernard Franzblau

[57] ABSTRACT

A single stage high frequency push-pull converter with input power factor correction. The boost converter for input power factor correction and the high-frequency push-pull DC/AC inverter are combined into a single stage converter thereby reducing the number of circuit components while at the same time reducing the voltage stress on the high frequency switching transistors of the converter.

20 Claims, 6 Drawing Sheets

DEAD TIME

HIGH FREQUENCY PUSH-PULL CONVERTER WITH INPUT POWER FACTOR CORRECTION

BACKGROUND OF THE INVENTION

The present invention relates to the field of high frequency converters and, more particularly, to a high frequency push-pull AC/AC converter with input power factor correction.

High frequency converters are known and have many useful applications in electronic technology. One particularly attractive application thereof is for the supply of regulated electric energy to electric discharge lamps. One of the desirable features of a high frequency converter is that it should have a high power factor as seen from the 60 Hz (50 Hz) AC power lines.

Figure 1:
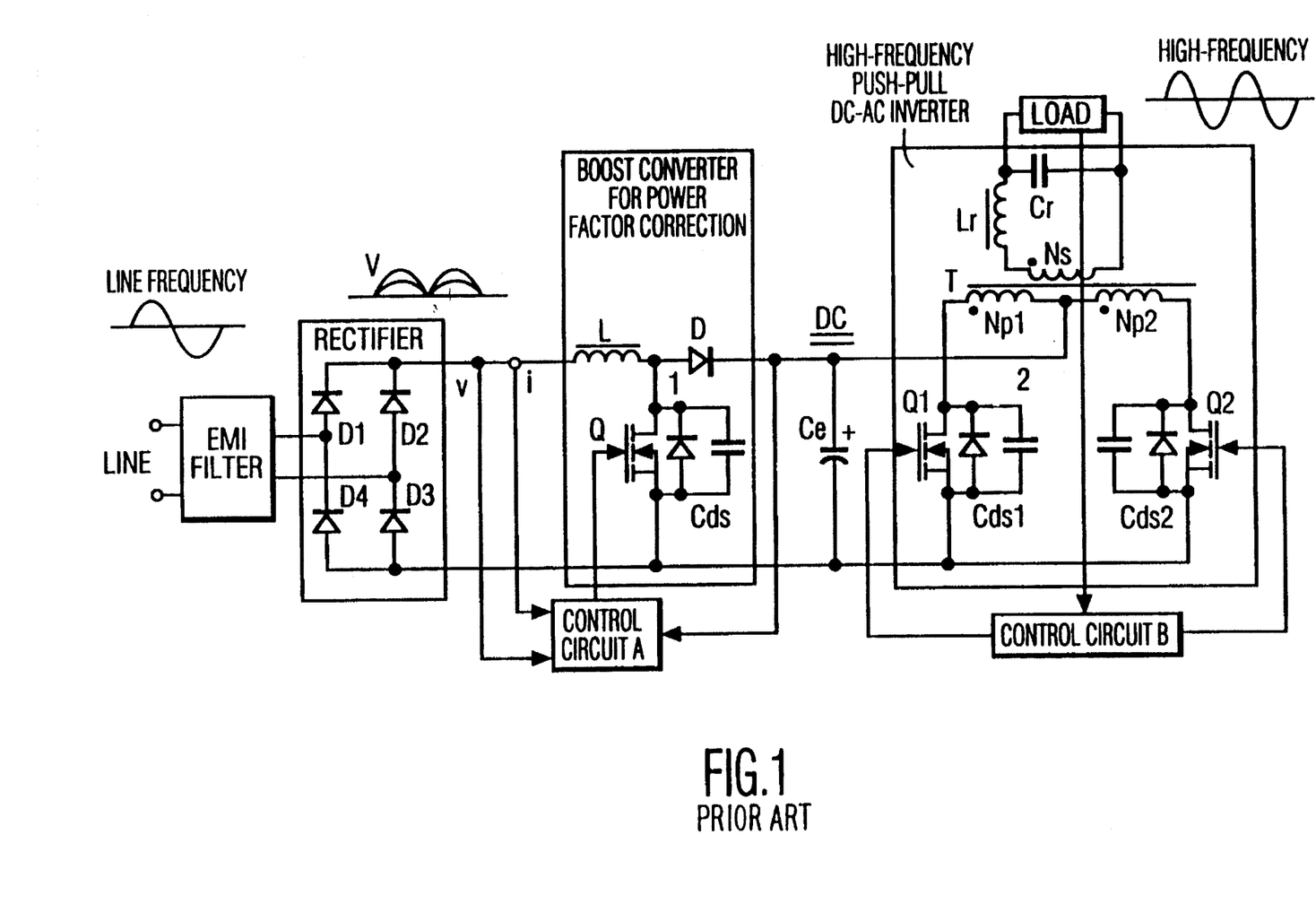
FIG. 1 is a block schematic diagram of a conventional AC/AC converter system using a boost converter for power factor correction and a push-pull inverter for DC/AC power conversion.

One example of a conventional high-frequency AC/AC converter system with a corrected input power factor is shown in FIG. 1, where a boost converter is provided for power factor correction and a push-pull inverter is used for high-frequency DC/AC power conversion. An electro-magnetic interference filter (EMI filter) is coupled to a pair of input terminals which supply, for example, a 60 Hz sinusoidal AC line frequency of a nominal voltage of 115 volts. The EMI filter is used to filter out the high frequency noise generated by the high frequency operation of the boost converter and the push-pull inverter. The AC line voltage is rectified by a full bridge diode rectifier circuit.

In FIG. 1, a boost converter 1 which provides power factor correction is coupled to the output terminals of the bridge rectifier circuit. The boost converter in its elemental form consists of an inductor L and a diode D connected in series circuit between a first input terminal and a first output terminal of the boost converter. The second input terminal and the second output terminal of the boost converter are connected in common. An energy storage capacitor $C_e$ is connected across the first and second output terminals of the boost converter. A switching field effect transistor Q is connected to a junction point between the inductor L and the diode D and to the common line connecting the second input and output terminals. The body diode and inherent capacitance $C_{ds}$ of the MOSFET Q is shown in parallel therewith. The gate electrode of the MOSFET Q is coupled to the output of a control circuit A.

In the boost converter stage, the current flowing through the inductor L is monitored and is compared in the control circuit A with reference values generated from the rectified voltage. The current waveform is shaped to have the same waveform as and to be in phase with the rectified voltage waveform by controlling the ON duty ratio and/or the switching frequency of the MOSFET switch Q. The output of the boost converter is a DC voltage roughly regulated by the control circuit A. This DC voltage is then inverted into a high frequency AC voltage by the high frequency push-pull DC/AC inverter 2.

The high frequency DC/AC inverter has its input terminals connected directly to the output terminals of the power factor correction boost converter 1. A first input terminal of the high frequency inverter is connected to a common junction point of a pair of primary windings Np1 and Np2 of an output transformer T. A secondary winding Ns of the transformer is coupled to a series circuit consisting of an inductor Lr and a capacitor Cr. The load is connected across the terminals of the capacitor $C_r$. One end of the primary winding Np1 and one end of the other primary winding Np2 are connected to the common output line via the MOSFET transistor switches Q1 and Q2, respectively. The respective body diodes and inherent capacitances of the MOSFET transistors Q1 and Q2 are also shown in the drawing. The gate electrodes of the MOSFET switching transistors Q1 and Q2 are connected to respective outputs of a control circuit B.

The high frequency power developed in the high frequency push-pull DC/AC inverter 2 is delivered to the load via the transformer T. The control circuit B has an input coupled to the load and is used to feed back the output power so as to control the operation frequency of the MOSFET switches in the high frequency DC/AC inverter so that a regulated output power can be obtained. Since the input power of the system has a low frequency (100 Hz or 120 Hz) component and the output power of the system is a regulated high frequency power, the storage capacitor $C_e$ is required between the boost converter and the push-pull inverter for energy storage in order to balance the input power and the output power.

An important disadvantage of the conventional high frequency converter circuit shown in FIG. 1 is that the voltage stress on the MOSFET switches Q1 and Q2 in the push-pull inverter 2 is high. If the ON duty ratio of the MOSFET switch Q in the boost converter is 50 percent, the voltage across the energy storage capacitor Ce will be twice the amplitude of the AC line voltage. In this case, the voltage stress on the MOSFET switches in the push-pull inverter will be four times the amplitude of the line voltage. The voltage stress can be reduced by employing a smaller duty ratio. However, the voltage across the energy storage capacitor will always be higher than the amplitude of the line voltage due to the boost converter operation. Typically, it is designed to be 1.5 times the amplitude of the line voltage. In that case, the voltage stress on the MOSFET switches Q1 and Q2 in the push-pull inverter will still be three times the amplitude of the line voltage.

It is also known to use a half-bridge inverter instead of the push-pull inverter in order to reduce the voltage stress on the MOSFET switches in the inverter. However, in this case, one of the two MOSFET switches is in the high voltage side of the circuit. A high-side driver is then required to drive the high side MOSFET, resulting in additional cost and complexity of the overall circuit.

In order to simplify the control circuit A, a discontinuous conduction mode (DCM mode) is usually adopted for the boost converter for power factor correction. In the DCM mode, the current flowing through the inductor L is discontinuous. If the ON duty ratio of the MOSFET Q is fixed, the peaks of the current through the inductor L will follow the waveform of the rectified line voltage. Therefore, a high input power factor can be obtained after the high frequency components of the inductor current are filtered out by the EMI filter. In this case, the feedback of the rectified voltage and the monitoring of the inductor current can be eliminated.

The conventional high frequency converters discussed above each include two high frequency power stages and two corresponding control circuits. One stage is for the input power factor correction and the other stage is for the DC/AC power conversion.

SUMMARY OF THE INVENTION

It is therefore an object of the present invention to provide a high frequency push-pull AC/AC converter system with input power factor correction in which the voltage stress on the high frequency switching transistors is significantly reduced over that of known conventional high frequency converters.

It is another object of the invention to provide a high frequency push-pull AC/AC converter system with input power factor correction which requires fewer semiconductor and other circuit components than in the prior art thereby reducing the size and complexity of the converter system which in turn provides a cost saving.

Another object of the invention is to provide a high frequency push-pull AC/AC power factor corrected converter system in which the boost converter stage and the high frequency inverter stage are combined into a single stage thereby saving one power stage and one control circuit while preserving all of the required functions of the conventional two-stage high-frequency converter system.

The foregoing objects and other advantages are provided in accordance with the present invention wherein a transformer, an inductor, an energy storage capacitor, first and second high frequency switching transistors and a single control circuit are coupled together in a novel and unique circuit arrangement that provides the power factor correction of the boost converter and the high frequency inverter function of the prior art systems, all in a single stage of the new circuit.

As a result of the invention, one MOSFET device is saved and hence one control circuit is also eliminated, which achieves a significant cost reduction. The voltage stress on the switching transistors is reduced to half that of the conventional AC/AC converter system using a push-pull inverter. An easier and cheaper MOSFET selection then is possible. Furthermore, both MOSFET switches are connected to ground so that, compared with the half-bridge inverter, a high side driver is eliminated. It then becomes easier to integrate the power MOSFETs with the control circuit. All of the MOSFET devices are zero-voltage-switched so that high frequency operation is possible and with a low degree of noise generation. The frequency of the high frequency current at the input of the rectifier is doubled due to the interleaving of the two power factor correction circuits. The current ripple thus is reduced so that the design of the EMI filter is simpler and easier. In one embodiment, the current in the power factor correction inductor is distributed in two inductors.

BRIEF DESCRIPTION OF THE DRAWINGS

The foregoing and other objects and advantages of the invention will be better appreciated from the following detailed description of the invention when taken in conjunction with the accompanying drawings in which.

DESCRIPTION OF THE PREFERRED EMBODIMENTS

Figure 2:
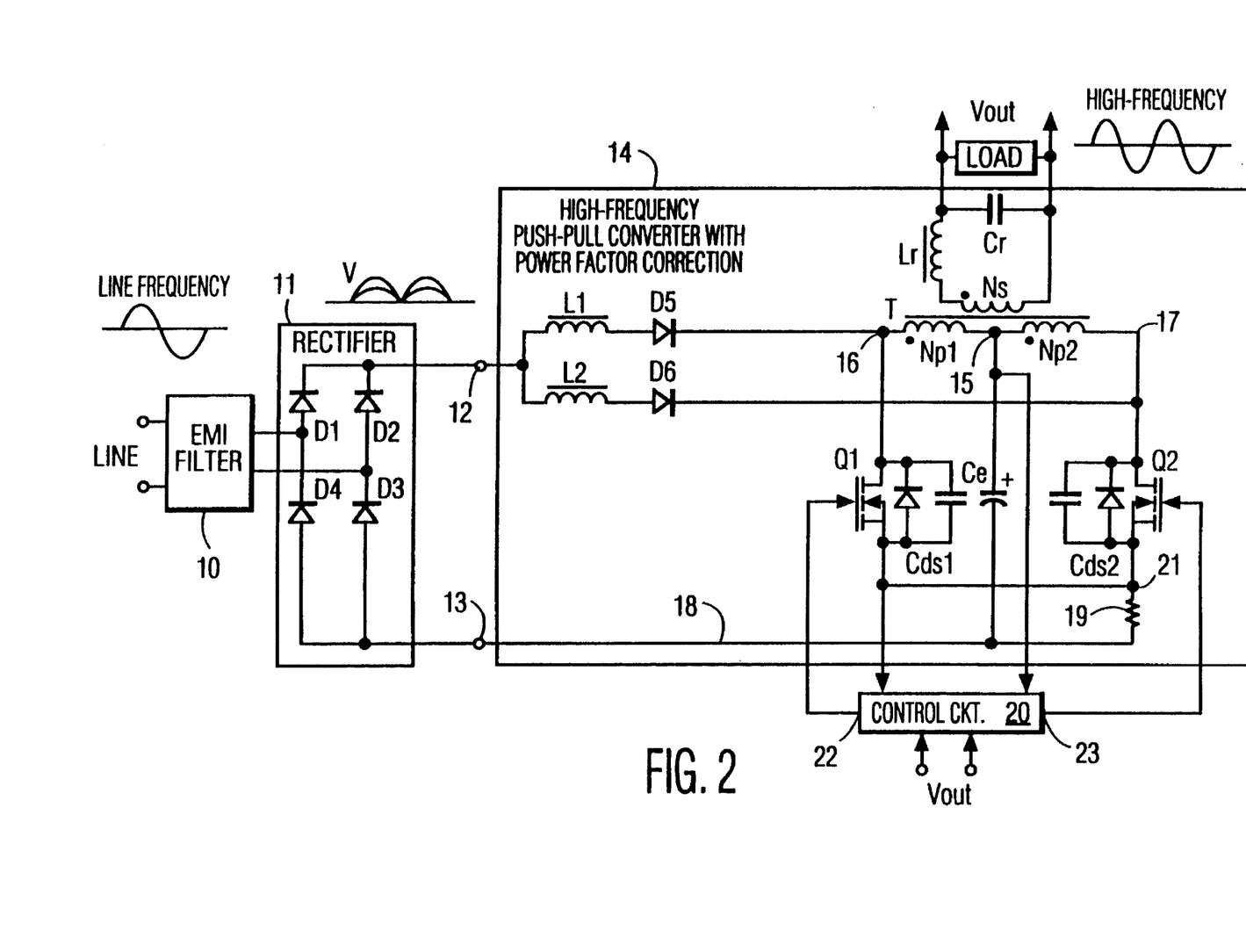
FIG. 2 is a block schematic diagram of a first embodiment of the invention.

FIG. 2 shows a high frequency push-pull AC/AC converter apparatus with input power factor correction in accordance with the invention. An electro-magnetic interference (EMI) filter 10 has its input coupled to terminals for supplying a 60 Hz (50 Hz) AC voltage from the usual available AC power line. The output of the EMI filter is coupled to input terminals of a full wave diode rectifier bridge circuit 11 having first and second output terminals coupled to first and second input terminals 12 and 13, respectively, of the high frequency push-pull converter circuit 14.

The input terminal 12 is connected to an inductor L1 and to an inductor L2. The inductors L1 and L2 in turn are connected to diodes D5 and D6, respectively. The diode D5 is connected to one end 16 of a primary winding Np1 of an output transformer T and diode D6 is connected to one end 17 of the primary winding Np2 of the output transformer. The common junction point 15 of the windings Np1 and Np2 is connected via an energy storage capacitor Ce to a common line 18 connected to the terminal 13.

The end point 16 is connected via a MOSFET switching transistor Q1 to a current sensor resistor 19 which in turn is connected to the common line 18. The other end point 17 is connected via a second MOSFET switching transistor Q2 to the current sensor resistor. The terminal 15 is coupled to an input of a control circuit 20 to supply a control signal thereto that is determined by the voltage $V_c$ stored on the capacitor $C_e$. The terminal 21 of the resistor 19 is coupled to another control input of the control circuit 20 to supply a control signal thereto that is determined by the currents IQ1, IQ2 that flow in the switching transistors Q1 and Q2, respectively. The control circuit in turn has output terminals 22 and 23 that supply switch control signals to the gate electrodes of high frequency switching transistors Q1 and Q2, respectively.

The secondary winding Ns of the output transformer T is connected to a series circuit composed of an inductor $L_r$ and a capacitor $C_r$. A load is connected across the terminals of the capacitor $C_r$ which constitute the output terminals of the high frequency push-pull converter. The winding sense of the transformer windings is indicated by the conventional dot symbols.

The high frequency push-pull converter circuit of FIG. 2 operates as follows: The two MOSFET switches Q1 and Q2 are turned on and off in a complementary manner, preferably with a 50 percent duty ratio as in the case of a conventional push-pull inverter. The inductor L1, diode D5 and MOSFET Q1 form a boost converter for power factor correction. The inductor L2, diode D6 and MOSFET Q2 form another boost converter. The inductance values of inductors L1 and L2 are designed to be equal. If the duty ratio is fixed, the boost converter will be operated in the discontinuous conduction mode so that it can be controlled by frequency modulation.

When one of the MOSFETs, e.g. Q1, is turned on, the rectified line voltage is applied to the inductor L1. Its current rises linearly from zero as follows:

$$i_L = \frac{|V_{in}|}{L_1} t \tag{1}$$

where, $|V_{in}|$ indicates the magnitude of the rectified line voltage during the ON period of transistor Q1, which can be considered to be constant over a high frequency switching cycle. The electric energy is stored in the inductor $L_1$ during the ON period of transistor Q1. The peak current is obtained as follows:

$$i_{LP} = \frac{|V_{in}|}{L_1} \times 0.5 T_s \qquad (2)$$

where, $T_s$ is the switching cycle.

When MOSFET Q1 is turned off by the control circuit 20, the MOSFET Q2 is turned on. There is a short dead-time at the switch over when transistors Q1 and Q2 are both simultaneously off. The voltage $V_c$ across the energy storage capacitor Ce is applied to the transformer primary winding Np2, inducing a voltage in winding Np1. As a result, an equivalent voltage source 2 Vc is connected to the inductor L1. The inductor current charges the capacitor Ce through winding Np1. Energy is transferred from inductor L1 to capacitor Ce. During the off period of the MOSFET Q1, current through the inductor L1 falls linearly from a peak value to zero:

$$i_L = \frac{V_{in}}{L_1} \; 0.5 \times T_s - \frac{2V_c - |V_{in}|}{L_1} \; t \qquad (3)$$

When the current falls to zero, it is clamped to zero thereafter by the diode D5. If the converter is so designed that the inductor current $i_L$ falls to zero just prior to the turn-on of MOSFET Q1 during the line peak period, then:

$$V_c = (V_{in})_{amp} \qquad (4)$$

from equation (3). Here, $(V_{in})_{amp}$ indicates the amplitude of the line voltage. Therefore, the voltage stress on the MOSFET Q1 is twice the amplitude of the line voltage. Compared with the conventional push-pull AC/AC converter system, the voltage stress is reduced.

As can be seen from equation (2), the peak of the inductor current is proportional to the input voltage if the switching frequency is fixed. The peaks of the current through inductor L1 follow the waveform of the rectified line voltage. The other half of the boost converter consisting of inductor L2, diode D6 and MOSFET Q2 operates exactly the same as the one consisting of L1, D5 and Q1, but with the half switching cycle shifted. The two boost converters act as interleaved power factor correction converters. The peaks of the sum of the two inductor currents, i.e. the current flowing through the rectifier circuit, also closely follow the waveform of the rectified line voltage. Therefore, a high input power factor can be obtained after the high frequency current components are filtered by the EMI filter. The high frequency ripple of the current flowing through the rectifier 11 is reduced and the ripple frequency is doubled by the interleaving of the two boost converters as compared with a conventional AC/AC converter system. The peak inductor current is also reduced to half. As a result, the design of the EMI filter is easier. The input power is controlled by frequency modulation of the switching transistors Q1 and Q2.

The MOSFETs Q1, Q2, transformer T, resonant inductor Lr, resonant capacitor Cr, and the load together form a high frequency push-pull DC/AC inverter. Its principle of operation is the same as that of the conventional high frequency push-pull DC/AC inverter. The DC voltage Vc developed across the energy storage capacitor Ce is inverted into a squarewave voltage at the secondary winding Ns of the output transformer by the on-off operation of the switching transistors Q1 and Q2. The squarewave voltage is filtered to produce a sinusoidal voltage by means of the L-C resonance of inductor Lr and capacitor Cr. The sinusoidal voltage across the resonant capacitor Cr is applied to the load. The voltage across the secondary winding Ns is a squarewave, the current flowing through the resonant inductor Lr is sinusoidal as is the output voltage across the resonant capacitor Cr when the load is a pure resistive load.

If the switching frequency is chosen to have a value above the resonant frequency, zero-voltage-switching can be realized for the two switching transistors Q1 and Q2 if a small dead time is provided in the gate control signals. During the dead time, both MOSFETs are off simultaneously. The current through the resonant inductor will charge one drain-source capacitor, for example, Cds1 and discharge the other drain-source capacitor Cds2. Therefore, the drain-source voltage rises up gradually after the MOSFET is turned off and falls to zero before the other MOSFET is turned on. Thus, zero voltage switching is achieved. Each MOSFET, Q1 and Q2, serves both for power factor correction and for high frequency power conversion.

Figure 3:
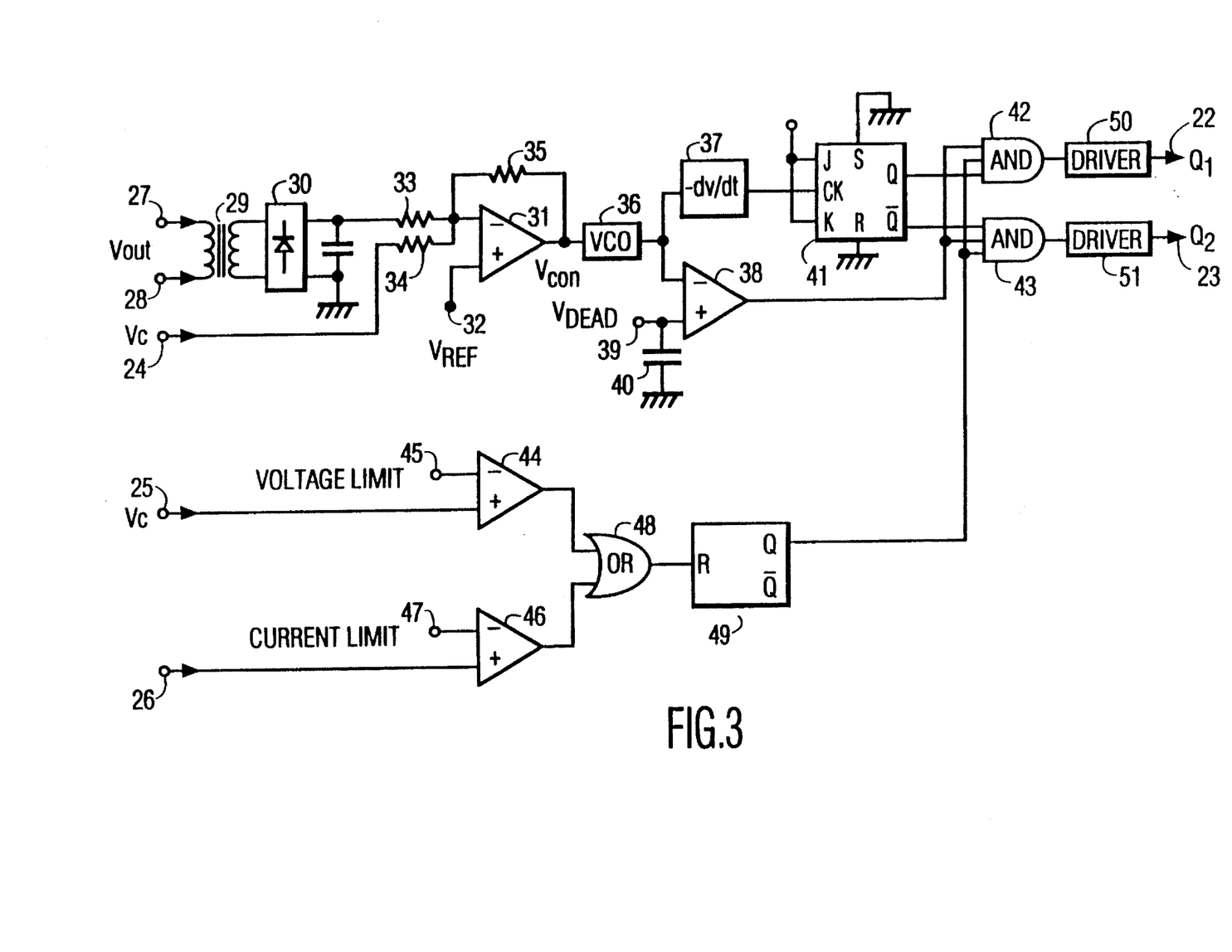
FIG. 3 is a block diagram of the control circuit used in the converter of FIG. 2, FIGS. 4A–4G show waveform diagrams helpful in describing the operation of the control circuit of FIG. 3.

FIG. 3 is a block diagram of one possible form of the control circuit 20 of FIG. 2. The voltage on the storage capacitor Ce at terminal 15 of FIG. 2 is coupled to the input terminals 24 and 25 of the control circuit of FIG. 3. A voltage proportional to the currents flowing through the switching transistors Q1 and Q2, IQ1 and IQ2, developed at terminal 21 in FIG. 2 is coupled to the input terminal 26 of the control circuit. In addition, a feedback voltage ($V_{out}$) developed across the output (load) is coupled to input terminals 27 and 28.

The input terminals 27 and 28 are coupled to the primary winding of a transformer 29 having a secondary winding coupled to input terminals of a diode rectifier circuit 30. One output terminal of the rectifier circuit is connected to ground and the other output terminal is connected to the inverting input (−) of an error amplifier 31 via a current limit resistor 33. The non-inverting input (+) of the error amplifier is connected to a source of reference voltage via a terminal 32. A control voltage from the storage capacitor $C_e$ (FIG. 2) at input terminal 24 is coupled to the inverting input of the error amplifier via another current limit resistor 34. A feedback resistor 35 is connected between the output of the error amplifier and its inverting input (−).

A control voltage, $V_{con}$ produced at the output of the error amplifier, is coupled to the input of a voltage controlled oscillator (VCO) 36. The output of the VCO 36 is in turn coupled to an input of a differentiator circuit 37 and to the inverting input (−) of a dead-time comparator 38. The non-inverting input (+) of the comparator is connected to a source of reference voltage for setting the dead-time via a terminal 39, and to ground via a soft-start capacitor 40.

The output of the differentiator circuit 37 is coupled to the clock input (ck) of a JK flip-flop 41. The R and S terminals of the flip-flop are connected to ground and the complementary output terminals, Q and $\overline{Q}$, are connected to respective first inputs of AND gates 42 and 43. The output of the comparator 38 is coupled to respective second inputs of the AND gates 42 and 43.

The non-inverting input (+) of an over-voltage protection comparator 44 is coupled to the input terminal 25 which receives the storage capacitor voltage Vc from terminal 15 in the converter of FIG. 2. The inverting input (−) of the comparator 44 is connected to a voltage limit reference voltage via a terminal 45.

The non-inverting input (+) of an overcurrent protection comparator 46 is connected to input terminal 26 which receives from terminal 21 of the converter (FIG. 2) a control voltage proportional to the respective currents IQ1 and IQ2 in the switching transistors Q1 and Q2. The inverting input (−) of the comparator 46 is connected to a terminal 47 which supplies a reference voltage that sets the current limit value for the converter. The respective outputs of the comparator circuits 44 and 46 are connected to first and second inputs of an OR gate 48.

The output of OR gate 48 in turn is coupled to a reset input (R) of a flip-flop 49. The Q output of the flip-flop is coupled to respective third inputs of the AND gates 42 and 43. The outputs of the AND gates 42 and 43 are coupled to inputs of driver circuits 50 and 51, respectively. The output of driver circuit 50 is coupled to the gate of switching transistor Q1 (FIG. 2) and the output of driver circuit 51 is coupled to the gate of switching transistor Q2.

Figure 5:
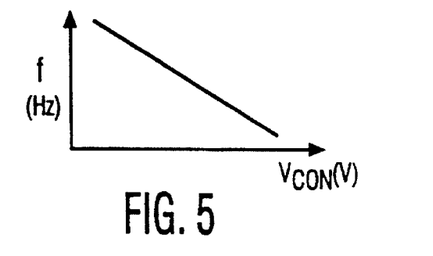
FIG. 5 is a diagram showing the operating characteristic of the voltage controlled oscillator of the control circuit.

The operation of the control circuit of FIG. 3 will be explained with reference to the voltage waveforms of FIG. 4 and the voltage/frequency diagram of FIG. 5. The waveforms (1)–(7) in FIG. 4 occur at the corresponding points labelled (1)–(7) in FIG. 3. In order to regulate the load voltage and current, the frequency of the output voltage of the voltage controlled oscillator 35 is inversely proportional to the control voltage $V_{con}$ applied to its input as shown in FIG. 5 of the drawing. The waveform of the VCO output voltage has a sawtooth shape as shown by the waveform in FIG. 4A. This sawtooth voltage is applied to the differentiator circuit 37 which produces at its output a series of voltage pulses coincident with each negative going transition of the sawtooth voltage waveform at its input (See FIG. 4B).

Figure 4A:
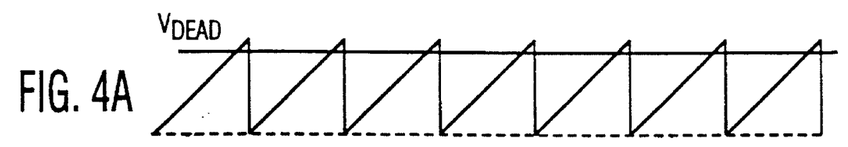
Figure 4B:
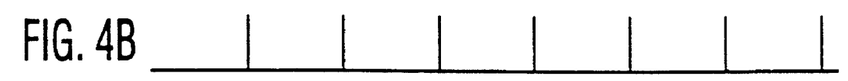
Figure 4C:
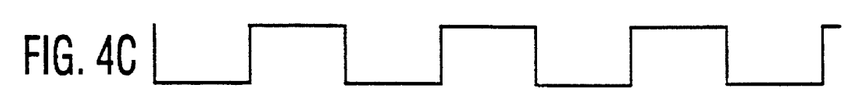
Figure 4D:
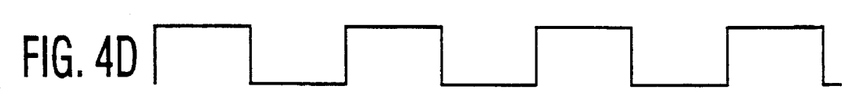

The output pulse of the differentiator circuit trigger the flip-flop 41 which in response produces two complementary squarewave output voltages as shown in FIGS. 4C and 4D.

Figure 4E:
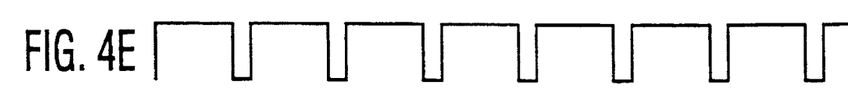

At the same time, the sawtooth voltage is applied to the inverting input of the comparator 38 where it is compared with a voltage $V_{dead}$ at terminal 39 which provides the dead-time setting for the system. Each time the sawtooth voltage crosses the DC reference, $V_{dead}$, in FIG. 4A, the comparator 38 changes state. FIG. 4E shows the squarewave output voltage of the comparator circuit 38. Each time the sawtooth voltage crosses the voltage $V_{dead}$, the comparator 38 changes state to generate the squarewave voltage of FIG. 4E which will determine the dead-time for the switching transistors Q1 and Q2 (FIG. 2).

Figure 4F:
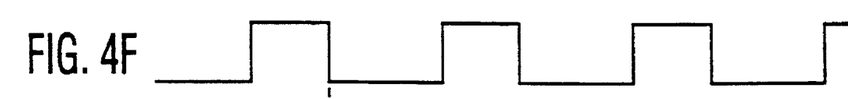

As long as the output of the flip-flop 49 is high, the AND gates 42 and 43 will provide an AND function for the squarewave voltages from flip-flop 41 and comparator circuit 38, that is AND gate 42 produces at its output the squarewave voltage in FIG. 4F derived from the Q output of flip-flop 41 (FIG. 4C) and the output of the comparator 38 (FIG. 4E). AND gate 43 performs a similar AND function for the squarewave voltages from the complementary Q output of flip-flop 41 and the output of comparator 38, i.e. it produces the AND function of the waveforms in FIGS. 4D and 4E to produce at its output the squarewave output voltage of FIG. 4G.

Figure 4G:
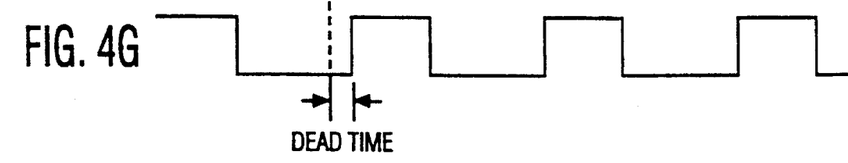

The push-pull voltages of FIGS. 4F and 4G with the short dead times are used to drive the switching transistors Q1 and Q2 via their respective driver circuits 50 and 51 and output terminals 22 and 23 of the control circuit.

The output voltage $V_{out}$ is applied to input terminals 27 and 28 and the capacitor voltage $V_c$ is applied to input terminal 24 of the control circuit. In the case of a light load or where the input line voltage is high, the output voltage $V_{out}$ at the load and the voltage $V_c$ on the storage capacitor $C_e$ (FIG. 2) will increase. In either case, the output voltage $V_{con}$ of the error amplifier 31 will decrease. The VCO 36 will then increase its frequency in accordance with the negative slope characteristic shown in FIG. 5. As a result, the control circuit will adjust so that the output voltage, $V_{out}$, and the storage capacitor voltage, $V_c$, will decrease, thereby opposing the initial increase in $V_{out}$ and $V_c$ caused by a light load or a higher line voltage. The closed loop negative feedback thus obtained tend to regulate the load voltage and current. The circuit operates in the opposite direction for a heavy load or a low input line voltage.

The control circuit also makes it possible to limit the voltage and current to a safe value by means of an overvoltage protection circuit and an overcurrent protection circuit. If the storage capacitor voltage Vc at input terminal 25 exceeds the voltage limit reference voltage at terminal 45, the comparator circuit 44 will change state and will trigger the flip-flop 49 via OR gate 48 so that the flip-flop will be reset to zero and its output voltage at the Q output goes low, thereby deactivating the AND gates 42 and 43. This prevents the passage of the output voltages of the flip-flop 41 and the output voltage of the comparator 38 to the driver circuits 50 and 51 so that the switching transistors Q1 and Q2 will be shut down.

In a similar manner, when the control voltage at input terminal 26, which is proportional to the currents IQ1 and IQ2 of the switching transistors Q1 and Q2, exceeds the current limit reference voltage at terminal 47, comparator circuit 46 changes state and resets the flip-flop 49 to zero via OR gate 48. The flip-flop 49 in turn closes down the AND gates 42 and 43 to shut off the switching transistors Q1 and Q2.

The comparator circuit 38 also provides a soft-start feature for the converter. During the start-up time of the converter, the voltage across the soft-start capacitor 40 increases slowly from zero. The dead time of the switching transistors is initially relatively long and gradually gets shorter as the capacitor 40 charges up. The duty ratio of the drive voltages of FIGS. 4F and 4G slowly increases from a low value to a larger value until it reaches the nominal operating value for the converter.

Figure 6:
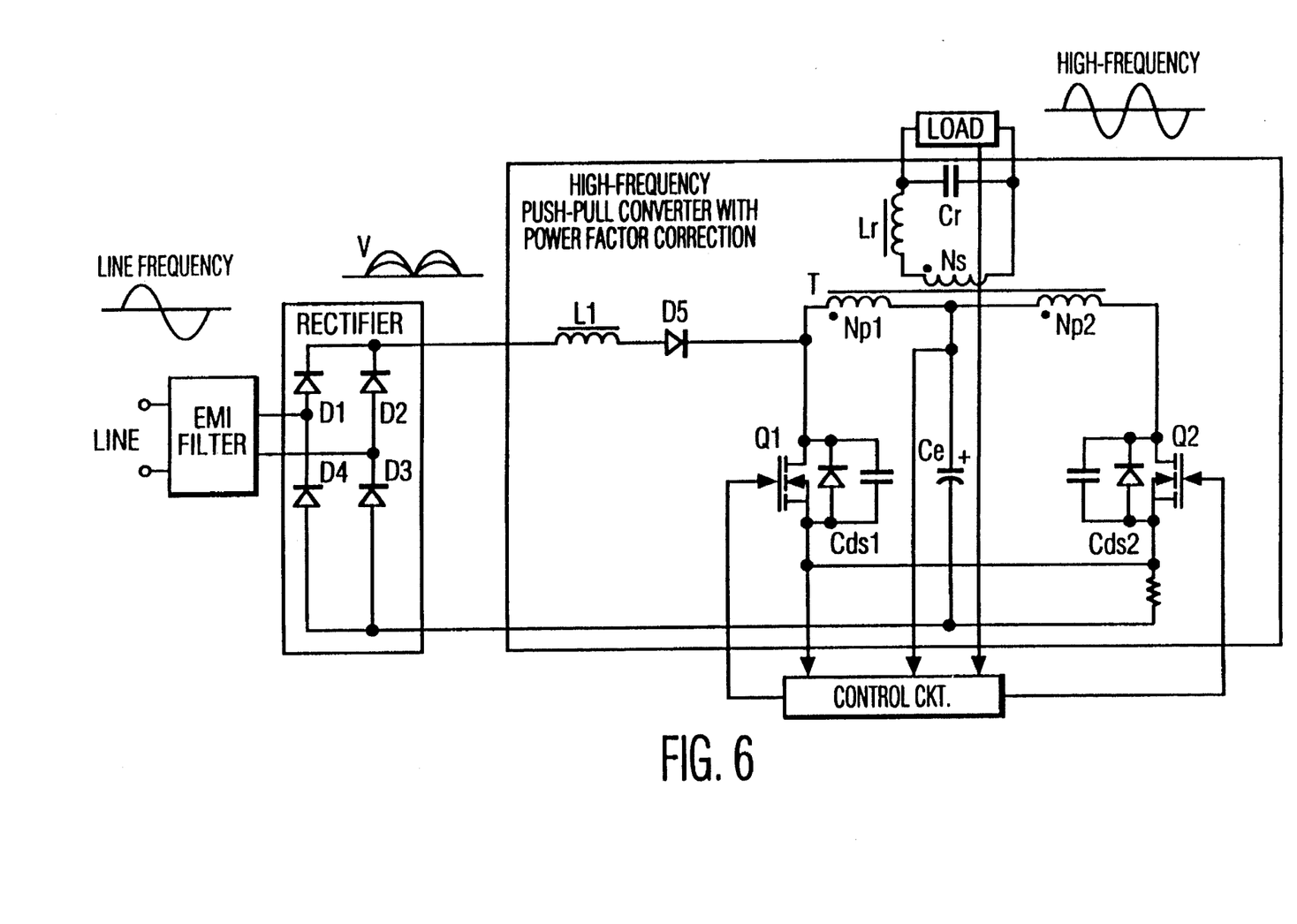
FIG. 6 is a block schematic diagram of a second embodiment of the invention.

FIG. 6 shows a modified embodiment of the invention in block schematic form. This circuit is similar to that of the converter circuit of FIG. 2 but only requires a single inductor L1 and a single diode D5 in the power factor correction portion of the converter. In this so-called single power factor correction inductor version of the converter, only the MOSFET Q1 contributes to the power factor correction function. The circuit of FIG. 6 otherwise operates in a manner similar to that of the converter of FIG. 2.

Figure 7:
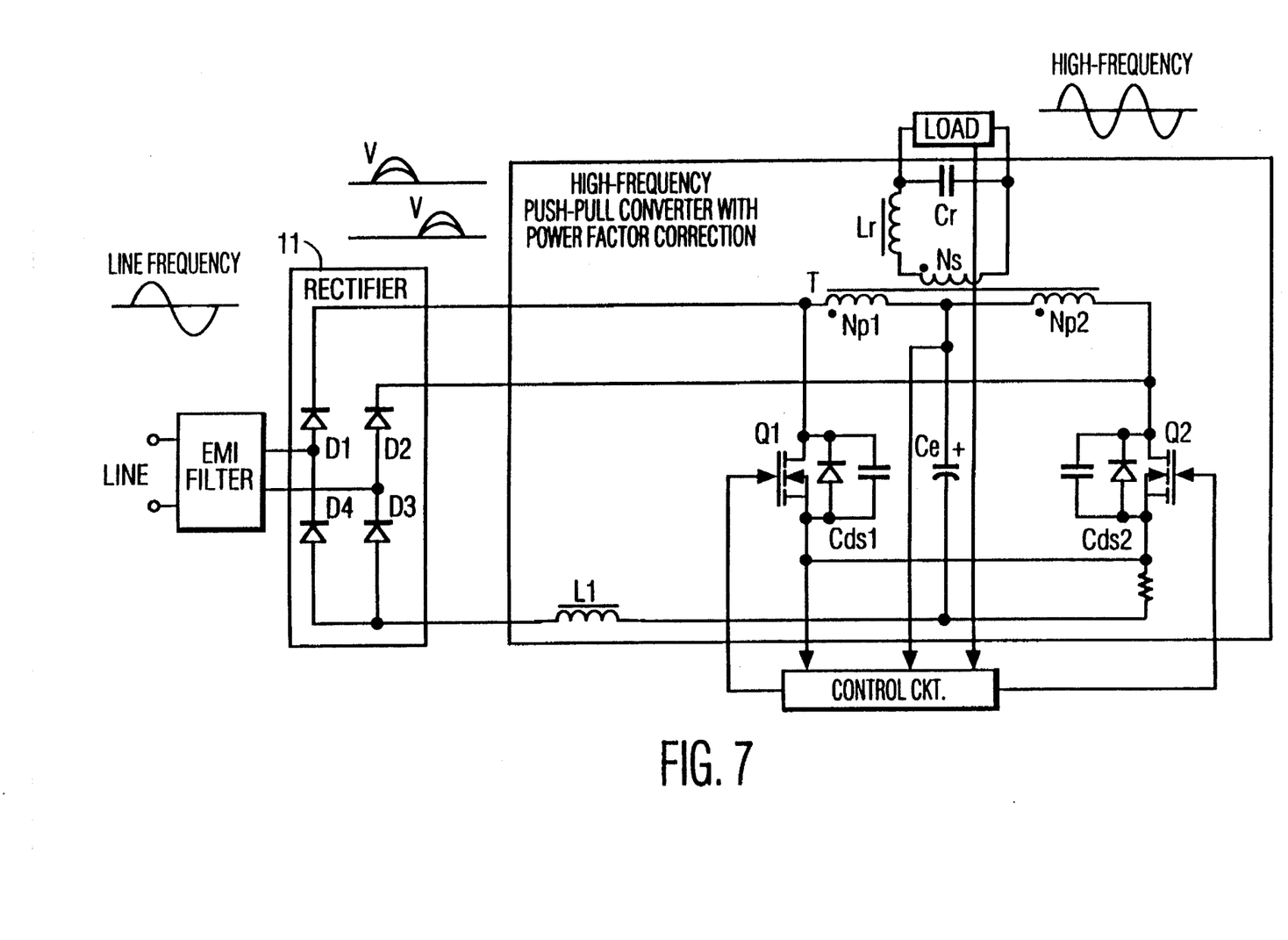
FIG. 7 is a block schematic diagram of a third embodiment of the invention.

Another variation of the invention is shown in FIG. 7 of the drawing. In this variation, one pair of diodes D1, D2 or D3, D4 of the diode rectifier bridge 11 comprise high frequency diodes for power factor correction. In this embodiment, the MOSFET Q1 contributes to power factor correction when the line voltage is positive and the MOSFET Q2 contributes to the power factor correction when the line voltage is negative. This circuit also operates in a manner similar to that of the converter of FIG. 2.

Although the present invention has been described and illustrated with reference to certain preferred embodiments thereof, it should be clearly understood that such description is by way of illustration and example only and that various alternatives will become obvious to persons skilled in the art. For example, other switching devices such as bipolar transistors, insulated gate bipolar transistors, and gate turn-off thyristors can also be used to replace the MOSFET switching devices of the invention. Accordingly, the scope of the present invention is to be limited only by the terms of the appended claims.

What is claimed is:

1. A single stage boost converter and high-frequency DC/AC power inverter apparatus comprising:

a pair of input terminals for connection to a source of AC voltage, rectifier means having an input coupled to said pair of input terminals and an output, a transformer having first and second primary windings and a secondary winding, inductor means coupling said first and second transformer primary windings to said output of the rectifier means, a pair of first and second switching transistors coupled to said first and second transformer primary windings to control current flow therein, a storage capacitor coupled to said first and second transformer primary windings and to the output of the rectifier means, a pair of output terminals for connection to a load, an LC resonant circuit coupling said transformer secondary winding to said pair of output terminals, and a single control circuit responsive to an output voltage at said output terminals and, via a circuit path independent of a load circuit coupled to said output terminals, to a voltage developed across the storage capacitor, thereby to supply complementary switching control signals to respective control electrodes of said first and second switching transistors.

2. An apparatus as claimed in claim 1 which includes only said first and second switching transistors for producing an AC current in said first and second transformer primary windings and for controlling a current flow from said output of the rectifier means to said storage capacitor.

3. An apparatus as claimed in claim 2 wherein;

said first and second primary windings each have first and second end terminals and with the first end terminals connected together to form a common junction point, said rectifier means comprises a diode bridge circuit coupled to said pair of input terminals, and said inductor means comprises first and second inductors connected in series circuit with first and second rectifier elements, respectively, between an output of the diode bridge circuit and respective second end terminals of said first and second transformer primary windings.

4. An apparatus as claimed in claim 1 wherein;

said rectifier means comprises a diode bridge circuit coupled to said pair of input terminals, and said inductor means comprises an inductor connected in series circuit with a rectifier element and one of said primary windings between an output of the diode bridge circuit and said storage capacitor.

5. An apparatus as claimed in claim 1 wherein;

said rectifier means comprises a diode bridge circuit coupled to said pair of input terminals, said diode bridge circuit including at least first and second high-frequency diodes coupled to said first and second transformer primary windings, respectively, and said inductor means includes an inductor coupled to a common terminal of at least two other diodes of the diode bridge circuit and to a terminal of said storage capacitor remote from the transformer primary windings.

6. An apparatus as claimed in claim 1 wherein said control circuit comprises;

a voltage controlled oscillator whose frequency is controlled by said output voltage and said storage capacitor voltage, a comparator circuit coupled to an output of the voltage controlled oscillator for deriving a first control voltage provided with a dead-time interval, AND-gate means having input means coupled to an output of said comparator circuit, means for coupling a second control voltage developed at the output of the voltage controlled oscillator to said input means of the AND-gate means, and means for supplying high-frequency complementary switching control signals derived at an output of the AND-gate means to the respective control electrodes of the first and second switching transistors.

7. An apparatus as claimed in claim 6 wherein the control circuit further comprises;

a differentiator circuit and a bistable device coupled in cascade between the output of the voltage controlled oscillator and the input means of the AND-gate means.

8. An apparatus as claimed in claim 7 wherein the control circuit further comprises;

a voltage-limit comparator circuit having an input coupled to the storage capacitor to receive a voltage determined by the storage capacitor voltage, a current-limit comparator circuit having an input which receives a control voltage determined by current flow through the first and second switching transistors, and a second bistable device coupled between outputs of the voltage-limit and current-limit comparator circuits and the input means of the AND-gate means.

9. An apparatus as claimed in claim 6 wherein said voltage controlled oscillator exhibits an inverse linear voltage/frequency characteristic.

10. An apparatus as claimed in claim 7 wherein said control circuit further comprises;

an error amplifier having a first input that receives a voltage determined by said output voltage and also receives said storage capacitor voltage and having a second input coupled to a source of reference voltage, said error amplifier having an output coupled to an input of the voltage controlled oscillator thereby to control the frequency thereof.

11. An apparatus as claimed in claim 1 further comprising;

means for deriving a control voltage determined by current flow through the first and second switching transistors, and means for supplying said control voltage to an input of the control circuit whereby the control circuit responds thereto so as to inhibit the supply of said complementary switching control signals to said first and second switching transistors when said control voltage reaches a predetermined limit value.

12. A high frequency push-pull converter power supply comprising:

an input terminal for connection to a source of supply voltage, an output terminal for connection to a load circuit, a transformer having first and second primary windings and a secondary winding coupled to said output terminal, an energy storage capacitor, inductor means coupling said input terminal via at least one of said first and second primary windings of the transformer to said energy storage capacitor, first and second switching transistors coupled to said first and second transformer primary windings so as to control current flow therein in a push-pull mode of operation, and a control circuit having input means coupled to said load circuit and to said storage capacitor such that the control circuit is responsive to a voltage determined by the load circuit and to a voltage developed across the storage capacitor thereby to supply complementary switching control signals to respective control electrodes of said first and second switching transistors.

13. The high frequency power supply as claimed in claim 12 wherein:

said transformer first and second primary windings each have first and second terminals and with said first terminals connected together to form a common junction point connected to said storage capacitor, and said inductor means comprise first and second inductors connected in respective first and second series circuits with respective first and second rectifier elements between said input terminal and respective second terminals of said first and second primary windings of the transformer.

14. The high frequency power supply as claimed in claim 12 wherein:

said inductor means comprises at least one inductor connected in a series circuit with a rectifier element and a primary winding of said transformer between said input terminal and said storage capacitor.

15. The high frequency power supply as claimed in claim 12 wherein said input means of the control circuit further receives a control voltage determined by current flow through said first and second switching transistors whereby the control circuit further controls said complementary switching control signals in response to said control voltage.

16. The high frequency power supply as claimed in claim 12 wherein said control circuit includes a comparator circuit having one input coupled to a source of reference voltage and a second input coupled to said input means so as to receive said storage capacitor voltage, whereby the control circuit adjusts said complementary switching control signals so as to regulate the storage capacitor voltage, and wherein said inductor means provide power factor correction for said high frequency power supply.

17. The high frequency power supply as claimed in claim 12 wherein:

said inductor means comprises first and second inductors connected in first and second respective series circuits with respective first and second rectifier elements and respective ones of said first and second primary windings between said input terminal and said storage capacitor.

18. The high frequency power supply as claimed in claim 12 further comprising:

a second input terminal for connection to said source of supply voltage, first and second diodes coupled between the first and second input terminals and respective end terminals of said first and second primary windings, third and fourth diodes each having a first terminal connected to a respective terminal of the first and second diodes and a second terminal connected in common via said inductor means to a terminal of the energy storage capacitor remote from the transformer primary windings.

19. The high frequency power supply as claimed in claim 12 wherein said secondary winding is coupled to an LC resonant circuit and said control circuit controls the voltage developed across the storage capacitor via said inductor means and said first and second switching transistors so that the developed storage capacitor voltage is limited to a value approximately equal to the value of the supply voltage at said input terminals.

20. The high frequency power supply as claimed in claim 12 wherein said secondary winding is coupled to an LC resonant circuit having a resonant frequency below the switching frequency of said first and second switching transistors thereby to provide a short dead time at switch over in which both of said transistors are turned off.

* * * * *